(12) United States Patent
Kang

(10) Patent No.: US 11,861,813 B2
(45) Date of Patent: Jan. 2, 2024

(54) IMAGE DISTORTION CORRECTION METHOD AND APPARATUS

(71) Applicant: GUANGDONG OPPO MOBILE TELECOMMUNICATIONS CORP., LTD., Guangdong (CN)

(72) Inventor: Jian Kang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 224 days.

(21) Appl. No.: 17/525,628

(22) Filed: Nov. 12, 2021

(65) Prior Publication Data

US 2022/0076391 A1   Mar. 10, 2022

Related U.S. Application Data

(63) Continuation of application No. PCT/CN2020/095025, filed on Jun. 9, 2020.

(30) Foreign Application Priority Data

Jun. 24, 2019 (CN) .......................... 201910550603.1

(51) Int. Cl.
H04N 23/80 (2023.01)
G06T 5/00 (2006.01)
H04N 23/698 (2023.01)

(52) U.S. Cl.
CPC .............. *G06T 5/006* (2013.01); *G06T 5/002* (2013.01); *H04N 23/698* (2023.01); *H04N 23/80* (2023.01); *G06T 2207/20081* (2013.01)

(58) Field of Classification Search
None
See application file for complete search history.

(56) References Cited

U.S. PATENT DOCUMENTS

| 5,905,530 A | 5/1999 | Yokota et al. |
| 2002/0097439 A1 | 7/2002 | Braica |

(Continued)

FOREIGN PATENT DOCUMENTS

| CN | 1684499 A | 10/2005 |
| CN | 103426149 A | 12/2013 |

(Continued)

OTHER PUBLICATIONS

Xiangde blog, [image] Detailed Explanation of Distortion Correction, http://blog.csdn.net/humanking7/article/details/45037239, 10 pages.

(Continued)

*Primary Examiner* — Eileen M Adams
(74) *Attorney, Agent, or Firm* — Young Basile Hanlon & MacFarlane, P.C.

(57) ABSTRACT

A method for correcting a distorted image includes: acquiring a first coordinate of each pixel in a distorted image to be corrected; determining internal parameters for shooting the distorted image; acquiring a second coordinate corresponding to the first coordinate based on a corresponding relationship between the internal parameters and image distortion degrees, in which the second coordinate is an undistorted coordinate; acquiring a distance between the first coordinate and a coordinate of a center point of the distorted image, and determining a smoothing processing coefficient corresponding to the distance based on a smoothing processing function, in which the smoothing processing function is configured to indicate a proportional relationship between the distance and the smoothing processing coefficient; and acquiring a distortion correction image by performing smoothing correction on each first coordinate based on the smoothing processing coefficient and the second coordinate.

20 Claims, 7 Drawing Sheets

(56) References Cited

U.S. PATENT DOCUMENTS

| | | | |
|---|---|---|---|
| 2003/0206179 A1 | 11/2003 | Deering | |
| 2003/0235343 A1 | 12/2003 | Kagaya | |
| 2006/0033999 A1 | 2/2006 | Liu et al. | |
| 2013/0100310 A1 | 4/2013 | Ebihara | |
| 2016/0065306 A1* | 3/2016 | Huang | H04W 4/70 398/118 |
| 2016/0253566 A1* | 9/2016 | Stein | G06T 7/13 348/148 |
| 2017/0359573 A1 | 12/2017 | Kim et al. | |
| 2018/0160045 A1* | 6/2018 | Yu | G06T 5/006 |

FOREIGN PATENT DOCUMENTS

| | | |
|---|---|---|
| CN | 103559684 A | 2/2014 |
| CN | 104182933 A | 12/2014 |
| CN | 104636743 A | 5/2015 |
| CN | 104994367 A | 10/2015 |
| CN | 105046657 A | 11/2015 |
| CN | 105488775 A | 4/2016 |
| CN | 106683068 A | 5/2017 |
| CN | 106815869 A | 6/2017 |
| CN | 107077719 A | 8/2017 |
| CN | 107424126 A | 12/2017 |
| CN | 108090880 A | 5/2018 |
| CN | 108761777 A | 11/2018 |
| CN | 109035170 A | 12/2018 |
| CN | 109255760 A | 1/2019 |
| CN | 109345461 A | 2/2019 |
| CN | 109461126 A | 3/2019 |
| CN | 109840894 A | 6/2019 |
| CN | 110276734 A | 9/2019 |
| EP | 1940180 A1 | 7/2008 |
| JP | 2011139158 A | 7/2011 |

OTHER PUBLICATIONS

Gadermayr et al., Evaluation of different distortion correction methods and interpolation techniques for an automated classification of cellad disease, 1 page.

Jiang Jing, Image Geometric Distortion Correction Based on Edge Detection Algorithm, Machine Vision, 80-83 pages.

Chinese Notice of Registration with English Translation for CN Application 201910550603.1 dated Feb. 8, 2021. (13 pages).

Chinese Office Action with English Translation for CN Application 201910550603.1 dated Dec. 3, 2020. (16 pages).

International Search Report with English Translation for PCT Application PCT/CN2020/095025 dated Sep. 9, 2020. (21 pages).

Liao et al., Pre-distortion Technology for Ideal-Time Correction of Binocular Digital Image, Electronics Optics Control, May 2018, 25(5)109-114.

Lu Kun, Research on Image Distortion Correction Algorithm of the Wide?Angle Lens, Huazhong University of Science and Technology, May 2015, 1 page.

Extended European Search Report for EP Application 20833621.4 dated Jun. 14, 2022. (7 pages).

* cited by examiner

IMAGE DISTORTION CORRECTION METHOD AND APPARATUS

CROSS-REFERENCE TO RELATED APPLICATION(S)

The application is continuation of International Application No. PCT/CN2020/095025, filed on Jun. 9, 2020, which claims the priority and benefit of Patent Application No. 201910550603.1 filed on Jun. 24, 2019, the entire contents of both of which are incorporated herein by reference.

TECHNICAL FIELD

The disclosure relates to a field of image processing technologies, and particularly to a method and an apparatus for correcting a distorted image.

BACKGROUND

At present, with the advancement of a smart terminal manufacturing technology, the smart terminal is provided with a camera module for users to take photographs, in which, it is common to install a wide-angle camera on the smart terminal.

SUMMARY

A first aspect of embodiments of the disclosure provides a method for correcting a distorted image. The method includes: acquiring a first coordinate of each pixel in a distorted image to be corrected; determining internal parameters for shooting the distorted image; acquiring a second coordinate corresponding to the first coordinate based on a corresponding relationship between the internal parameters and image distortion degrees, in which the second coordinate is an undistorted coordinate corresponding to the first coordinate; acquiring a distance between the first coordinate and a coordinate of a center point of the distorted image, and determining a smoothing processing coefficient corresponding to the distance based on a smoothing processing function, in which the smoothing processing function is configured to indicate a proportional relationship between the distance and the smoothing processing coefficient; and acquiring a distortion correction image by performing smoothing correction on the first coordinate based on the smoothing processing coefficient and the second coordinate.

A second aspect of embodiments of the disclosure provides an apparatus for correcting a distorted image. The apparatus includes: a processor and a memory configured to store with computer programs executable by the processor. The processor is configured to acquire a first coordinate of each pixel in a distorted image to be corrected; determine internal parameters for shooting the distorted image; acquire a second coordinate corresponding to the first coordinate based on a corresponding relationship between the internal parameters and image distortion degrees, in which the second coordinate is an undistorted coordinate corresponding to the first coordinate; acquire a distance between the first coordinate and a coordinate of a center point of the distorted image; determine a smoothing processing coefficient corresponding to the distance based on a preset smoothing processing function, in which the smoothing processing function is configured to indicate a proportional relationship between the distance and the smoothing processing coefficient; and acquire a distortion correction image by performing smoothing correction on the first coordinate based on the smoothing processing coefficient and the second coordinate.

A third aspect of embodiments of the disclosure provides an electronic device. The electronic device includes a wide-angle camera, an image signal processor (ISP), a central processing unit (CPU), a display and an encoder. The wide-angle camera may be configured to acquire a distorted image to be corrected. The ISP may be configured to process the distorted image in raw format into a distorted image in yuv format. The CPU may be configured to acquire a first coordinate of each pixel in the distorted image in yuv format, determine internal parameters for shooting the distorted image, acquire a second coordinate corresponding to the first coordinate based on a corresponding relationship between the internal parameters and image distortion degrees, in which the second coordinate is an undistorted coordinate corresponding to the first coordinate, acquire a distance between the first coordinate and a coordinate of a center point of the distorted image in yuv format, and determine a smoothing processing coefficient corresponding to the distance based on a smoothing processing function, in which the smoothing processing function is configured to indicate a proportional relationship between the distance and the smoothing processing coefficient, and acquiring a distortion correction image in yuv format by performing smoothing correction on each first coordinate based on the smoothing processing coefficient and the second coordinate. The display may be configured to display the distortion correction image in yuv format. The encoder may be configured to perform a Jpeg format coding on the distortion correction image in yuv format and store in a memory of the electronic device.

Additional aspects and advantages of the present disclosure will be set forth in part in the following description, and in part will become obvious from the following description, or may be learned by practice of the disclosure.

BRIEF DESCRIPTION OF DRAWINGS

The above and/or additional aspects and advantages of the present disclosure may become obvious and easily understood in descriptions of embodiments in combination with the drawings.

DETAILED DESCRIPTION

Embodiments of the present disclosure are described in detail below, and examples of embodiments are illustrated in the accompanying drawings, throughout which the same or similar labels represent the same or similar elements or elements with the same or similar functions. The embodiments described below with reference to the drawings are exemplary, are intended to explain the present disclosure and are not to be construed as a limitation to the present disclosure.

Compared with a conventional lens camera, the wide-angle camera has a larger field of vision (FOV), however, there is a large distortion for the wide-angle camera, and the image edge may have a serious distortion. In the related art, in order to compensate for the distortion of an image shot by the wide-angle camera, the distortion of the image needs to be corrected. The disclosure is intended to provide a solution of solving the technical problem in the related art that a corrected distortion image has low resolution due to directly processing the distortion image based on an interpolation algorithm.

Figure 2:
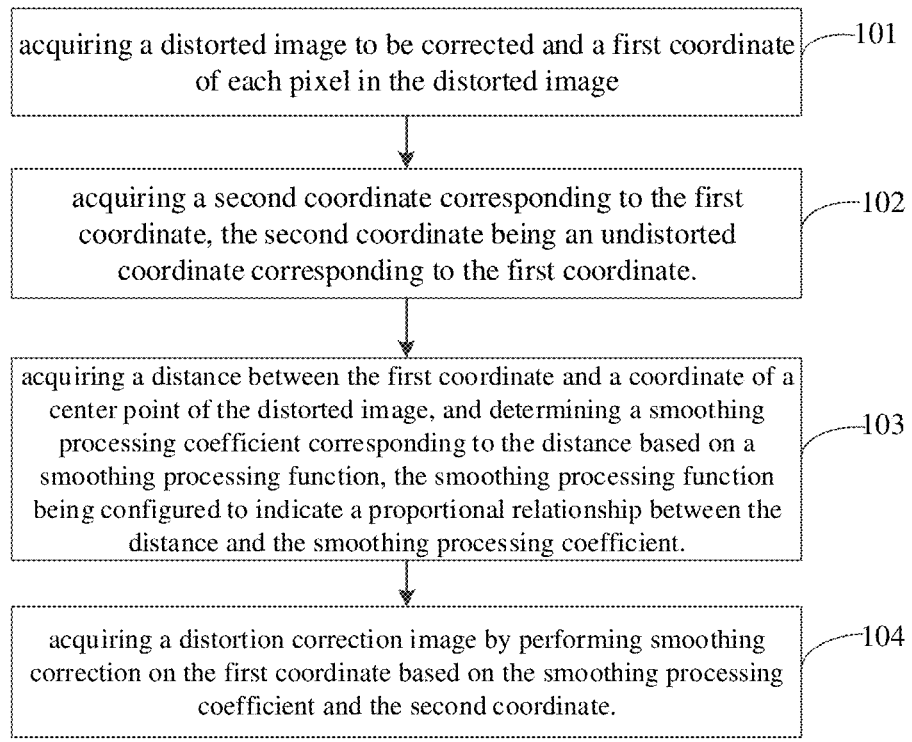
FIG. 2 is a flowchart of a method for correcting a distorted image according to an embodiment of the disclosure.

Referring to FIG. 2, the method for correcting a distorted image in the embodiment of the disclosure includes the following steps: acquiring a distorted image to be corrected and a first coordinate of each pixel in the distorted image; acquiring a second coordinate corresponding to the first coordinate, in which the second coordinate is an undistorted coordinate corresponding to the first coordinate; acquiring a distance between the first coordinate and a coordinate of a center point of the distorted image, and determining a smoothing processing coefficient corresponding to the distance based on a smoothing processing function, in which the smoothing processing function is configured to indicate a proportional relationship between the distance and the smoothing processing coefficient; and acquiring a distortion correction image by performing smoothing correction on the first coordinate based on the smoothing processing coefficient and the second coordinate.

In some embodiments, acquiring the second coordinate corresponding to the first coordinate, includes: determining internal parameters of a camera module for shooting the distorted image; and acquiring the second coordinate by calculating the internal parameters and the first coordinate based on a preset algorithm.

In some embodiments, the smoothing processing function is:

$$S(x) = \frac{1}{1 + e^{-20(x-0.5)}},$$

where, x is a normalized distance corresponding to the distance, and S(x) is the smoothing processing coefficient.

In some embodiments, acquiring the distortion correction image by performing smoothing correction on the first coordinate based on the smoothing processing coefficient and the second coordinate, includes: determining a floating point coordinate corresponding to each first coordinate by calculating the smoothing processing coefficient, the second coordinate and the first coordinate based on a preset algorithm; acquiring an integer coordinate and a pixel value of each pixel by performing interpolation calculation on the floating point coordinate; and acquiring the distortion correction image based on the integer coordinate point and the pixel value.

In some embodiments, acquiring the distortion correction image by performing smoothing correction on the first coordinate based on the smoothing processing coefficient and the second coordinate, includes: determining a first weight of the second coordinate and a second weight of the first coordinate based on the smoothing processing coefficient, in which the first weight is proportional to the smoothing processing coefficient and the second weight is inversely proportional to the smoothing processing coefficient; calculating a first product of the first weight and the second coordinate, and a second product of the second weight and the first coordinate; and acquiring the distortion correction image by performing smoothing correction on the first coordinate based on a sum of the first product and the second product.

Figure 6:
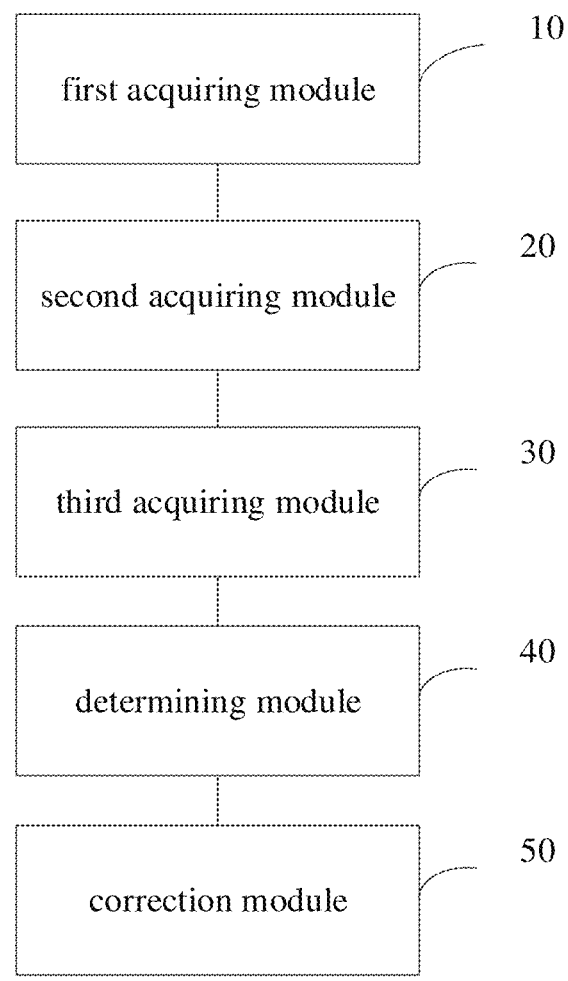
FIG. 6 is a structural diagram of an apparatus for correcting a distorted image according to a first embodiment of the disclosure.

Referring to FIG. 6, the apparatus for correcting a distorted image in the embodiment of the disclosure includes a first acquiring module 10, a second acquiring module 20, a third acquiring module 30, a determining module 40 and a correction module 50. The first acquiring module 10 is configured to acquire a distorted image to be corrected and a first coordinate of each pixel in the distorted image. The second acquiring module 20 is configured to calculate a second coordinate corresponding to the first coordinate, in which the second coordinate is an undistorted coordinate corresponding to the first coordinate. The third acquiring module 30 is configured to acquire a distance between the first coordinate and a coordinate of a center point of the distorted image. The determining module 40 is configured to determine a smoothing processing coefficient corresponding to the distance based on a preset smoothing processing function, in which the smoothing processing function is configured to indicate a proportional relationship between the distance and the smoothing processing coefficient. The correction module 50 is configured to acquire a distortion correction image by performing smoothing correction on the first coordinate based on the smoothing processing coefficient and the second coordinate.

Figure 7:
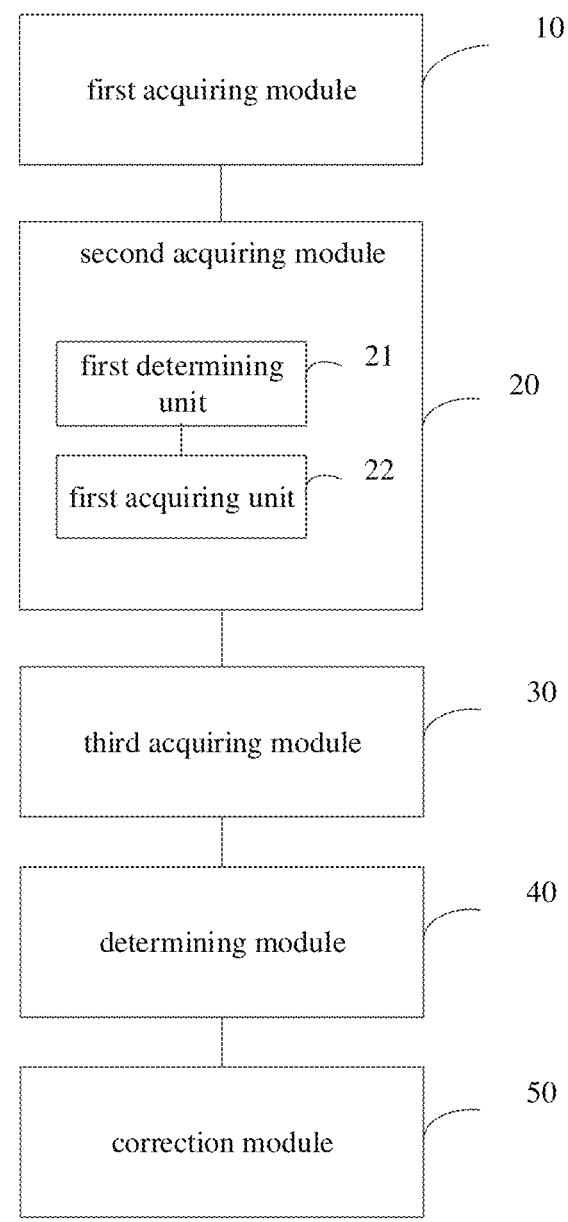
FIG. 7 is a structural diagram of an apparatus for correcting a distorted image according to a second embodiment of the disclosure.

Referring to FIG. 7, the second acquiring module 20 includes a first determining unit 21 and a first acquiring unit 22. The first determining unit 21 is configured to determine internal parameters of a camera module for shooting the distorted image. The first acquiring unit 22 is configured to acquire the second coordinate by calculating the internal parameters and the first coordinate based on a preset algorithm.

In some embodiments, the smoothing processing function is:

$$S(x) = \frac{1}{1 + e^{-20(x-0.5)}},$$

where, x is a normalized distance corresponding to the distance, and S(x) is the smoothing processing coefficient.

Figure 8:
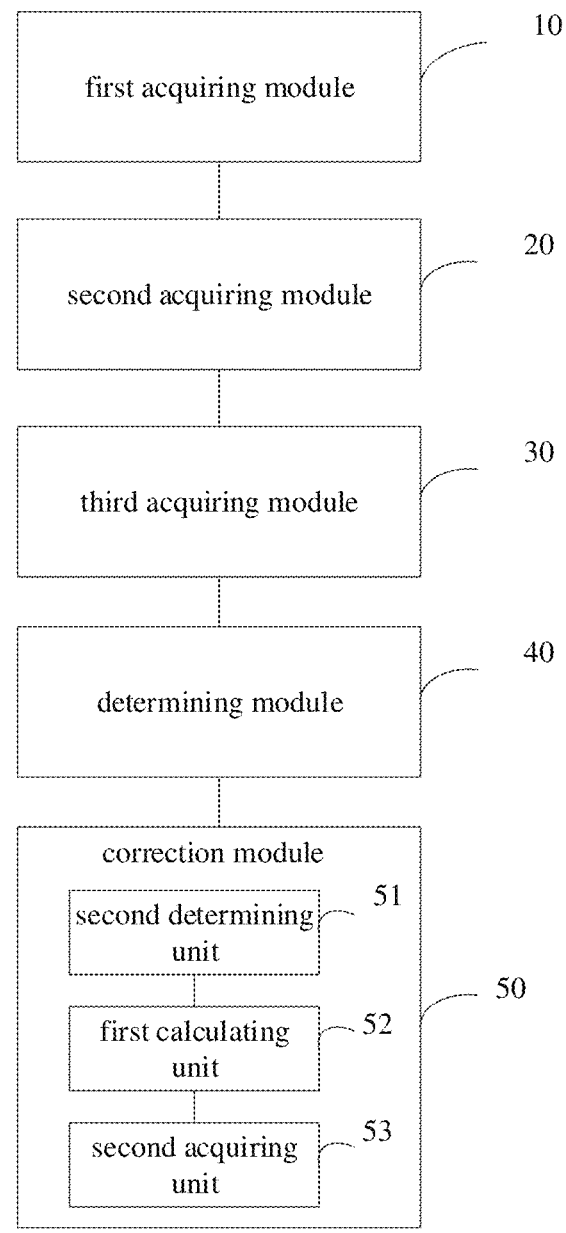
FIG. 8 is a structural diagram of an apparatus for correcting a distorted image according to a third embodiment of the disclosure.

Referring to FIG. 8, in some embodiments, the correction module 50 includes a second determining unit 51, a first calculating unit 52 and a second acquiring unit 53. The second determining unit 51 is configured to determine a floating point coordinate corresponding to each first coordinate by calculating the smoothing processing coefficient, the second coordinate and the first coordinate based on a preset algorithm. The first calculating unit 52 is configured to acquire an integer coordinate and a pixel value of each pixel by performing interpolation calculation on the floating point coordinate. The second acquiring unit 53 is configured to acquire the distortion correction image based on the integer coordinate point and the pixel value.

Figure 9:
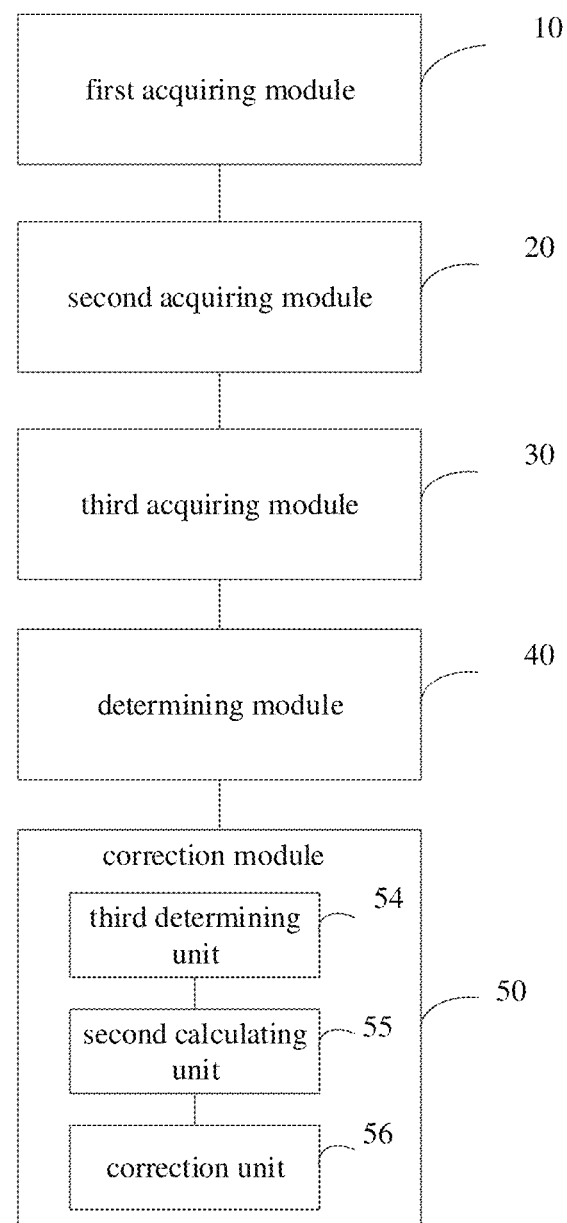
FIG. 9 is a structural diagram of an apparatus for correcting a distorted image according to a fourth embodiment of the disclosure.

Referring to FIG. 9, in some embodiments, the correction module 50 includes a third determining unit 54, a second calculating unit 55 and a correction unit 56. The third determining unit 54 is configured to determine a first weight of the second coordinate and a second weight of the first coordinate based on the smoothing processing coefficient, in which the first weight is proportional to the smoothing processing coefficient and the second weight is inversely proportional to the smoothing processing coefficient. The second calculating unit 55 is configured to calculate a first product of the first weight and the second coordinate, and a second product of the second weight and the first coordinate. The correction unit 56 is configured to acquire the distortion correction image by performing smoothing correction on the first coordinate based on a sum of the first product and the second product.

The electronic device in the embodiment includes a memory, a processor and computer programs stored on the memory and executable by the processor. When the computer programs are executed by the processor the following steps are implemented: acquiring a distorted image to be corrected and a first coordinate of each pixel in the distorted image; acquiring a second coordinate corresponding to the first coordinate, in which the second coordinate is an undistorted coordinate corresponding to the first coordinate; acquiring a distance between the first coordinate and a coordinate of a center point of the distorted image, and determining a smoothing processing coefficient corresponding to the distance based on a smoothing processing function, in which the smoothing processing function is configured to indicate a proportional relationship between the distance and the smoothing processing coefficient; and acquiring a distortion correction image by performing smoothing correction on the first coordinate based on the smoothing processing coefficient and the second coordinate.

In some embodiments, when the computer programs are executed by the processor, the following steps may be further implemented: determining internal parameters of a camera module for shooting the distorted image; and acquiring the second coordinate by calculating the internal parameters and the first coordinate based on a preset algorithm.

In some embodiments, the smoothing processing function is:

$$S(x) = \frac{1}{1 + e^{-20(x-0.5)}},$$

where, x is a normalized distance corresponding to the distance, and S(x) is the smoothing processing coefficient.

In some embodiments, when the computer programs are executed by the processor, the following steps may be further implemented: determining a floating point coordinate corresponding to each first coordinate by calculating the smoothing processing coefficient, the second coordinate and the first coordinate based on a preset algorithm; acquiring an integer coordinate and a pixel value of each pixel by performing interpolation calculation on the floating point coordinate; and acquiring the distortion correction image based on the integer coordinate point and the pixel value.

In some embodiments, when the computer programs are executed by the processor, the following steps may be further implemented: determining a first weight of the second coordinate and a second weight of the first coordinate based on the smoothing processing coefficient, the first weight being proportional to the smoothing processing coefficient and the second weight being inversely proportional to the smoothing processing coefficient; calculating a first product of the first weight and the second coordinate, and a second product of the second weight and the first coordinate; and acquiring the distortion correction image by performing smoothing correction on the first coordinate based on a sum of the first product and the second product.

A non-transitory computer readable storage medium is stored with computer programs thereon in the embodiment of the disclosure. When the computer programs are executed by the processor, the following steps are implemented: acquiring a distorted image to be corrected and a first coordinate of each pixel in the distorted image; acquiring a second coordinate corresponding to the first coordinate, in which the second coordinate is an undistorted coordinate corresponding to the first coordinate; acquiring a distance between the first coordinate and a coordinate of a center point of the distorted image, and determining a smoothing processing coefficient corresponding to the distance based on a smoothing processing function, in which the smoothing processing function is configured to indicate a proportional relationship between the distance and the smoothing processing coefficient; and acquiring a distortion correction image by performing smoothing correction on the first coordinate based on the smoothing processing coefficient and the second coordinate.

In some embodiments, when the computer programs are executed by the processor, the following steps may be further implemented: determining internal parameters of a camera module for shooting the distorted image; and acquiring the second coordinate by calculating the internal parameters and the first coordinate based on a preset algorithm.

In some embodiments, the smoothing processing function is:

$$S(x) = \frac{1}{1 + e^{-20(x-0.5)}},$$

where, x is a normalized distance corresponding to the distance, and S(x) is the smoothing processing coefficient.

In some embodiments, when the computer programs are executed by the processor, the following steps may be further implemented: determining a floating point coordinate corresponding to each first coordinate by calculating the smoothing processing coefficient, the second coordinate and the first coordinate based on a preset algorithm; acquiring an integer coordinate and a pixel value of each pixel by performing interpolation calculation on the floating point coordinate; and acquiring the distortion correction image based on the integer coordinate point and the pixel value.

In some embodiments, when the computer programs are executed by the processor, the following steps may be further implemented: determining a first weight of the second coordinate and a second weight of the first coordinate based on the smoothing processing coefficient, the first weight being proportional to the smoothing processing coefficient and the second weight being inversely proportional to the smoothing processing coefficient; calculating a first product of the first weight and the second coordinate, and a second product of the second weight and the first coordinate; and acquiring the distortion correction image by performing smoothing correction on the first coordinate based on a sum of the first product and the second product.

A method and an apparatus for correcting a distorted image in the embodiments of the disclosure are described with reference to the drawings. The application body of the method for correcting a distorted image in the embodiment of the disclosure is a smart terminal with a camera module including wide-angle cameras, and the smart terminal may be a mobile phone, a notebook computer, a smart wearable device, etc.

At present, on the smart terminal, if the influence of gray values of several points just adjacent to a sample point to be detected is only considered, but the influence of a change rate of the gray values among these adjacent points is not considered, a high frequency component of the interpolated image may be lost and the image edge may become blurred to a certain degree. Comparing the output image obtained by the method with the input image, there still exists a problem that the image quality is damaged and the calculation precision is not high due to improper consideration of the interpolation function design.

For the technical problem in the related art that the definition of the corrected distortion image obtained directly with a bilinear interpolation algorithm is lost, the disclosure provides a novel method for distortion correction, which achieves correcting the distortion at different regions of the image in different degrees by introducing a weighted smoothing function, and reduces the loss of image definition as much as possible while ensuring high timeliness of the algorithm.

Figure 1:
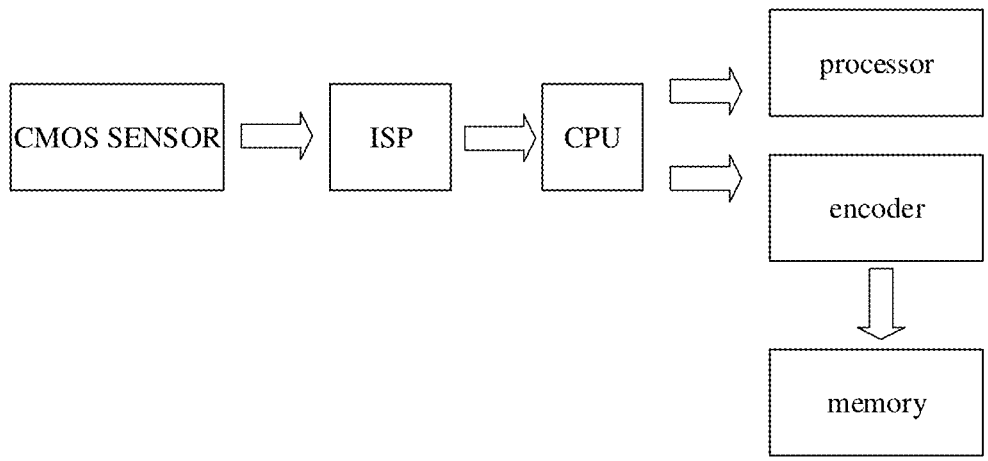
FIG. 1 is a hardware flowchart according to the embodiment of the disclosure.

The execution body for improving image distortion correction in the embodiments of the disclosure is a CPU of a smart terminal. As illustrated in a hardware flowchart of the solution in FIG. 1, on the smart terminal, firstly, a cmos sensor in a wide-angle camera performs photosensitive processing to convert an optical signal into raw format data; the raw format data is then processed by an image signal processor (ISP) to convert an image into one in a yuv format; calculation is performed by the CPU, distortion correction is performed on the yuv image through previously known camera internal parameters; finally, after the distortion correction processing, the yuv data is sent to a display for displaying, and a Jpeg format coding is performed by a coder and stored in a memory of the smart terminal.

Specifically, FIG. 2 is a flowchart of a method for correcting a distorted image according to an embodiment of the disclosure. The image distortion processing in the embodiment of the disclosure is described in taking a distorted image shot by a wide-angle camera as an example. As illustrated in FIG. 2, the method includes: at 101, a distorted image to be corrected and a first coordinate of each pixel in the distorted image are acquired.

Specifically, a distorted image previously shot by the camera module may be read from a system memory, a distorted image shot by the camera module in real time may be obtained, and a distorted image may be an image that is processed by conventional de-distortion. Since the image after distortion processing in the related art is still distorted, it is defined as a distorted image in the disclosure. Further, the first coordinate of each pixel in the distorted image is acquired based on an image recognition algorithm.

At 102, a second coordinate corresponding to the first coordinate is acquired, in which the second coordinate is an undistorted coordinate corresponding to the first coordinate.

Specifically, the first coordinate of the distorted image is a coordinate with a certain distortion, assuming that when there is no shooting distortion in the image shot by the camera module for shooting a distorted image, the coordinate corresponding to the first coordinate should be the second coordinate, at this time, in order to achieve the correction of the first coordinate, a second coordinate without distortion may be acquired based on a corresponding relationship between internal parameters of the camera module and image distortion degrees. The image distortion degrees are decided by the internal parameters of the camera module.

In a possible implementation, internal parameters of the camera module for shooting the distorted image are determined, which determine a distortion degree of the first coordinate, and a second coordinate corresponding to the first coordinate is determined based on a corresponding relationship between the internal parameters and the distortion degrees.

Specifically, in the embodiment, the camera module is controlled to shoot a trained object at a plurality of angles and obtain a plurality of reference images, in which the trained object has a regular shape, a contour mark, etc. so as to quickly find a reference point in the corresponding image for calibrating. For example, the trained object may be a checkerboard pattern, so that the pixel of each checkerboard corner is easily detected. The checkerboard corner in the checkerboard pattern may be served as a reference point. Further, an image coordinate corresponding to the reference point in the trained object in each reference image is acquired, and a world coordinate based on the reference point is pre-measured. The internal parameters of the camera module may be calculated based on world coordinates and image coordinates of pre-stored reference points. The internal parameters may include an x-coordinate cx and a y-coordinate cy of a principal point, a normalized focal length fx in x direction, a normalized focal length fy in y direction, radial distortion coefficients k1, k2, k3 and tangential distortion coefficients p1, p2. Further, the distorted first coordinate and the internal parameters are calculated based on a preset calculation equation to acquire a second coordinate.

For example, when the trained object is a checkerboard, the plane checkerboard pattern plate is shot at different angles with a camera to obtain 6-9 full-size images, ensuring that the checkerboard pattern is full of the whole FOV of the camera, in which the pixel point of each checkerboard corner is easily detected and the checkerboard corner in the checkerboard pattern may be served as a reference point. The checkerboard corner is detected at a sub-pixel scale on the collected 6-9 full-size reference images to obtain image coordinates of the checkerboard corners of each image. Since the checkerboard for calibrating is customized and the coordinate of the corner on a three-dimensional world space is previously known, the world coordinate of the reference point in the checkerboard may be obtained. The internal parameters of the camera may be obtained based on a corresponding relationship between image planes and checkerboard planes through the obtained image coordinate of the reference point and the world coordinate of the reference point.

Further, an original undistorted image is calculated by the x-coordinate cx and y-coordinate cy of the principal point, the normalized focal length fx in x direction, the normalized focal length fy in y direction, the radial distortion coefficients k1, k2, k3, the tangential distortion coefficients p1, p2 and the known distorted images in the obtained internal parameters of the camera. Specifically, for a second coordinate (u0, v0), the corresponding camera coordinate (that is, a coordinate corresponding to an undistorted coordinate in a camera coordinate system) is (x0, y0), where $$x0 = \frac{u0 - cx}{fx};$$

$$y0 = \frac{v0 - cy}{fy};$$

A coordinate of a distorted point corresponding to the camera coordinate is (x', y'), where $$x'=x0\cdot(1+k1\cdot r^2+k2\cdot r^4+k3\cdot r^6)+2p1\cdot x0\cdot y0+p2\cdot(r^2+2x0^2);$$

$$y'=y0\cdot(1+k1\cdot r^2+k2\cdot r^4+k3\cdot r^6)+2p2\cdot x0\cdot y0+p1\cdot(r^2+2y0^2);$$

where, $r^2=x0^2+y0^2$;

Further, a distorted coordinate (a first coordinate) of the obtained distorted point in the distorted image is calculated below:

$$ud=fx\cdot x'+cx;$$

$$vd=fy\cdot y'+cy;$$

In this way, the distorted (first) coordinate (ud, vd) corresponding to the undistorted (second) coordinate (u0, v0) in the undistorted image is obtained, and based on the corresponding relationship, the second coordinate may be calculated.

As another possible implementation, a depth model is pre-trained based on a large number of sample images, the input of the depth model is a distorted first coordinate, and the output is an undistorted second coordinate. The trained depth model represents the corresponding relationship between internal parameters of the camera module and image distortion degrees. Therefore, the second coordinate may be determined by inputting the first coordinate into the trained depth model.

At 103, a distance between the first coordinate and a coordinate of a center point of the distorted image is acquired, and a smoothing processing coefficient corresponding to the distance is determined based on a smoothing processing function, in which the smoothing processing function is configured to indicate a proportional relationship between the distance and the smoothing processing coefficient.

It may be understood that, due to shooting mechanism of the camera module, the closer to the edge of the image, the higher the distortion degree, the closer to the central region, the smaller the distortion degree. Therefore, a distance between a distorted coordinate and a coordinate of a center point of the distorted image may be calculated, and a smoothing processing coefficient may be calculated based on the preset smoothing processing function and the distance, in which the smoothing processing coefficient is configured to correct a distorted image.

It should be noted that, the smoothing processing function is configured to indicate a proportional relationship between the distance and the smoothing processing coefficient. That is, the closer to the edge region of the image, the larger the distance, the larger the smoothing processing coefficient, the stronger the correction processing; the further to the edge region of the image, the smaller the distance, the smaller the smoothing processing coefficient, the weaker the correction processing. Therefore, it is obvious that, the smoothing processing function may enable the correction degree of the distorted image from the center to the edge to be gradually enhanced, which accordingly ensures smoothing transition, enhances the authenticity of the processed image, and achieves smoothing correction on the distorted image based on the smoothing processing function.

In an embodiment of the disclosure, a distance may be calculated by an equation (1), where, in the following equation, x is a normalized Euclidean distance value between a current first coordinate (ud, vd) and a coordinate of a center point of the distorted image (u', v'):

$$x=\sqrt{(ud-u')^2+(vd-v')^2} \qquad \text{equation (1)}$$

Figure 3:
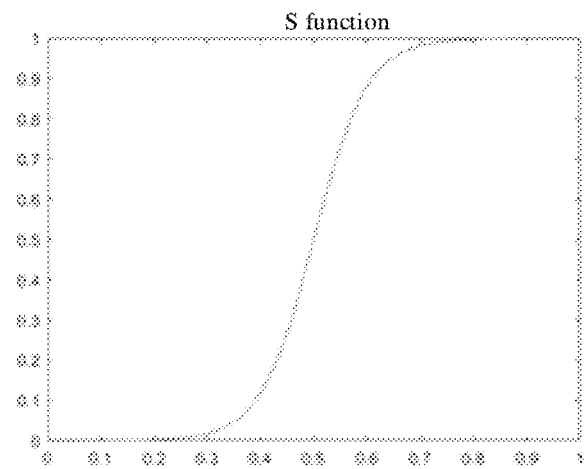
FIG. 3 is a diagram of a smoothing processing function according to an embodiment of the disclosure.

Further, as a possible example, a smoothing processing function is expressed by an equation (2), $$S(x) = \frac{1}{1+e^{-20(x-0.5)}}, \qquad \text{equation (2)}$$

where, x is a Euclidean distance corresponding to the distance, S(x) is a smoothing processing function. In the example, the corresponding smoothing processing function is illustrated in FIG. 3, where the horizontal axis is the Euclidean distance, and the longitudinal axis is a value of the smoothing processing coefficient. As illustrated in FIG. 3, the larger the Euclidean distance, the larger the value of the smoothing processing coefficient. The value of the smoothing processing coefficient is smoothly increased to ensure the processing quality of the subsequent image.

At 104, a distortion correction image is acquired by performing smoothing correction on the first coordinate based on the smoothing processing coefficient and the second coordinate.

Specifically, smoothing correction is performed on the first coordinate in combination with the smoothing processing coefficient and the second coordinate. At this time, since an undistorted coordinate is combined when the distortion is corrected, the definition of the image may be greatly improved. Furthermore, the smoothing processing coefficient is related to the distance and is basically a positive correlation function of the distance. In the image of the wide-angle camera, the distortion amplitude of the central region is relatively small and that of the edge region is relatively large, the sensitivity of the human eye on the definition of the image central region is higher than that on the definition of the edge region. Therefore, it is achieved that the correction degree of central distortion, and the distortion correction degree from the image center point to the image edge may be sequentially smoothly enhanced by the smoothing processing coefficient. In this way, the definition of the image center may be ensured, and the distortion correction degree of the image edge may be also ensured.

As a possible implementation, the first coordinate is corrected by a preset equation as illustrated in an equation (3), where (u1, v1) is a floating point coordinate, (u0, v0) is an undistorted coordinate, (ud, vd) is a distorted coordinate, and s is a smoothing coefficient. Based on the above description, the closer to the edge region, the larger the s, the closer the obtained (u1, v1) is to the distorted coordinate (ud, vd), and the higher the corresponding correction degree is; the closer to the central region, the smaller the s, the closer the obtained (u1, v1) is to the undistorted coordinate (u0, v0), and the smaller the corresponding correction degree.

$$(u1,v1)=(ud,vd)\cdot s+(u0,v0)\cdot(1-s) \qquad \text{equation (3)}$$

Based on the imaging principle, an integer coordinate and a pixel value of each pixel are acquired by performing interpolation calculation on the floating point coordinate; and an undistorted image is acquired based on the integer coordinate and the pixel value.

Specifically, at this time, the (u1, v1) is often a floating point coordinate, and the actual image coordinate (u2, v2) is an integer coordinate. Therefore, a pixel gray value of the integer coordinate (u2, v2) is obtained by performing interpolation calculation on adjacent pixels of the floating point coordinate (u1, v1). In an embodiment, the RGB value of the integer coordinate may be obtained by respectively performing interpolation calculation. A bilinear interpolation method may be used to perform linear interpolation in the x and y directions respectively with gray scales of four adjacent pixels of the pixel to be solved.

Figure 4:
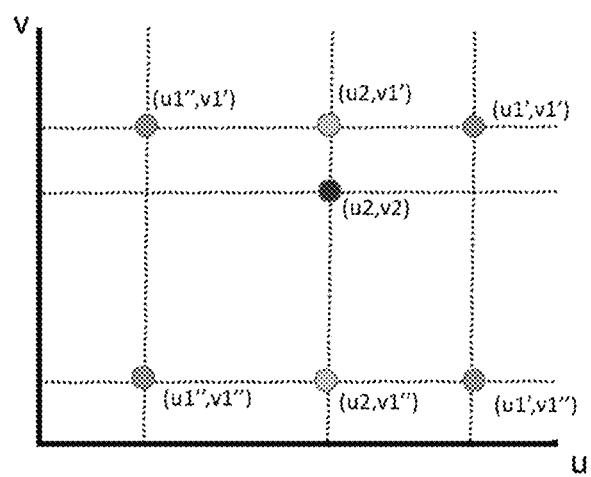
FIG. 4 is a diagram of a bilinear interpolation algorithm according to an embodiment of the disclosure.

As illustrated in FIG. 4, four known floating point coordinates adjacent to an unknown integer coordinate (u2, v2) calculated in u and v directions are (u1', v1'), (u1", v1'), (u1", v1"), (u1', v1"), respectively. At the first step, (u2, v1') is obtained by performing linear interpolation on (u1", v1') and (u1', v1') in u direction, and (u2, v1") is obtained by performing linear interpolation is performed on (u1", v1") and (u1', v1") in u direction; at the second step, a pixel gray value corresponding to the integer coordinate (u2, v2) is obtained by performing linear interpolation on (u2, v1') and (u2, v1") in v direction. (u2, v2) sequentially traverses the coordinates of all pixels of the whole image, so as to obtain a distortion correction image.

Figure 5:
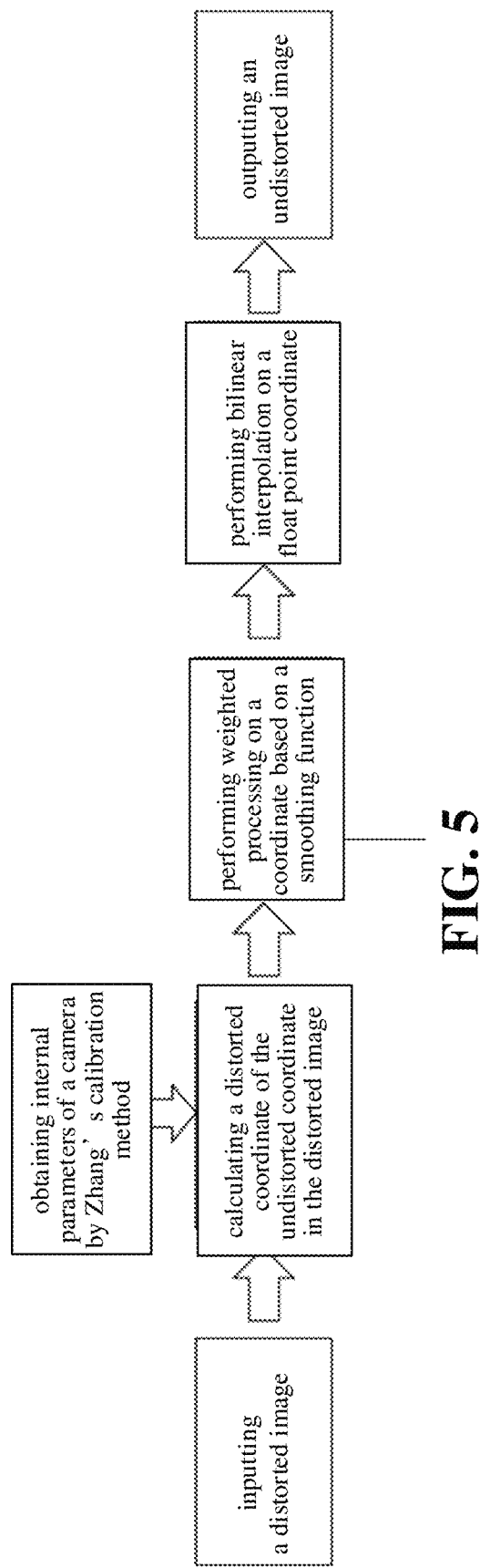
FIG. 5 is a flowchart of a method for correcting a distorted image according to a specific embodiment of the disclosure.

Therefore, on the basis of ensuring high timeliness of an algorithm, the loss of image definition after interpolation is weakened as much as possible. As an example, a specific flowchart framework of the algorithm is illustrated in FIG. 5, where internal parameters of a camera are obtained by Zhang's calibration method, including principal point coordinates (cx, cy), focal lengths (fx, fy), radial distortion coefficients (k1, k2, k3) and tangential distortion coefficients (p1, p2); a distorted coordinate (ud, vd) of the undistorted coordinate (u0, v0) in the distorted image is calculated; weighted fusion is performed on (ud, vd) and (u0, v0) by the smoothing function in the embodiments to obtain a fused floating point coordinate (u1, v1); and bilinear interpolation is performed on the (u1, v1) to obtain a final coordinate (u2, v2) of the distortion correction image. A complete distortion correction image may be obtained by traversing all coordinates.

As another possible implementation, a first weight of the second coordinate and a second weight of the first coordinate are determined based on the smoothing processing coefficient, in which the first weight is proportional to the smoothing processing coefficient and the second weight is inversely proportional to the smoothing processing coefficient; a first product of the first weight and the second coordinate, and a second product of the second weight and the first coordinate are calculated; and a distortion correction image is acquired by performing smoothing correction on the first coordinate based on a sum of the first product and the second product. Therefore, the closer to the edge of the distorted image, the more stronger the coordinate correction of relevant pixels in a consideration ratio of second coordinate, the closer to the center, the more dependent on the original first coordinate so as to remain the relevant pixels, thereby ensuring the authenticity of the image and improving the smoothness of the corrected pattern.

Of course, in an embodiment of the disclosure, considering that in different scenarios, when de-distortion processing is performed on the distorted image, the center region with a high definition and the edge region with a high distortion correction degree are different in size ratio, so correction adjustment degrees may be acquired and correction adjustment coefficients are determined based on the correction adjustment degrees. For example, a progress bar of the correction degree may be provided, and the correction adjustment coefficient may be determined based on a corresponding relationship between the progress bar and the correction degree. For another example, the shot object corresponding to the distorted image may be automatically detected, different correction degrees are determined based on different types and colors of the shot object, for example, a correction degree of the shot object being a face image is relatively high, and the correction degree is higher when the shot image is a night scene image compared to the correction degree when it is shot in daytime.

In summary, with the method for correcting a distorted image in the embodiment of the disclosure, a distorted image to be corrected and a first coordinate of each pixel in the distorted image are acquired, and a second coordinate corresponding to the first coordinate is calculated, in which the second coordinate is an undistorted coordinate corresponding to the first coordinate, a distance between the first coordinate and a coordinate of a center point of the distorted image is further calculated, and a smoothing processing coefficient corresponding to the distance is determined based on a preset smoothing processing function, in which the smoothing processing function is configured to indicate a proportional relationship between the distance and the smoothing processing coefficient; and a distortion correction image is acquired by performing smoothing correction on the first coordinate based on the smoothing processing coefficient and the second coordinate. Thus, an improvement is performed based on a conventional wide-angle distortion correction algorithm, distortion correction processing is performed by additionally using a weighted smoothing function and still using a bilinear interpolation algorithm. Compared with the conventional distortion correction algorithm, a distribution of distortion in the whole image is considered, and it is achieved that the distortion for different regions of the image is distinguished for correction, on the basis of ensuring high timeliness of the algorithm, not only a loss degree of definition of the distortion correction image is weakened, but also the distortion of the image region with a large distortion is completely eliminated, which achieves an optimal photographing experience.

In order to achieve the above embodiments, the disclosure provides an apparatus for correcting a distorted image. FIG. 6 is a structural diagram of an apparatus for correcting a distorted image according to an embodiment of the disclosure. As illustrated in FIG. 6, the apparatus for correcting a distorted image includes a first acquiring module 10, a second acquiring module 20, a third acquiring module 30, a determining module 40 and a correction module 50.

The first acquiring module 10 is configured to acquire a distorted image to be corrected and a first coordinate of each pixel in the distorted image.

Specifically, the first acquiring module 10 may read a distorted image previously shot by the camera module from a system memory, and may also acquire a distorted image shot by the camera module in real time, and a distorted image may be an image that is processed by a conventional de-distortion. Since the image after distortion processing in the related art is still distorted, it is defined as a distorted image in the disclosure. Further, the first acquiring module 10 acquires a first coordinate of each pixel in the distorted image based on an image recognition algorithm.

The second acquiring module 20 is configured to calculate a second coordinate corresponding to the first coordinate, in which the second coordinate is an undistorted coordinate corresponding to the first coordinate.

Specifically, the first coordinate of the distorted image is a coordinate with a certain distortion, assuming that when there is no shooting distortion in the image shot by the camera module for shooting a distorted image, the coordinate corresponding to the first coordinate should be the second coordinate, at this time, in order to achieve the correction of the first coordinate, the second acquiring module 20 may acquire a second coordinate without distortion.

In an embodiment of the disclosure, as illustrated in FIG. 7, on the basis of FIG. 6, the second acquiring module 20 includes a first determining unit 21 and a first acquiring unit 22.

The first determining unit 21 is configured to determine internal parameters of the camera module for shooting the distorted image.

The first acquiring unit 22 is configured to acquire the second coordinate by calculating the internal parameters and the first coordinate based on a preset algorithm.

Specifically, in the embodiment, the camera module is controlled to shoot a trained object at a plurality of angles and obtain a plurality of reference images, in which the trained object has a regular shape, a contour mark, etc. so as to quickly find a reference point in the corresponding image for calibrating. For example, the trained object may be a checkerboard pattern, so that the pixel of each checkerboard corner is easily detected. The checkerboard corner in the checkerboard pattern may be served as a reference point. Further, the first determining unit 21 acquires an image coordinate corresponding to the reference point in the trained object in each reference image, and a world coordinate based on the reference point is pre-measured, and internal parameters of the camera module may be calculated based on world coordinates and image coordinates of pre-stored reference points. The internal parameters may include an x-coordinate cx and a y-coordinate cy of a principal point, a normalized focal length fx in x direction, a normalized focal length fy in y direction, radial distortion coefficients k1, k2, k3 and tangential distortion coefficients p1, p2. Further, the first acquiring unit 22 calculates the distorted first coordinate and the internal parameters based on a preset equation to acquire a second coordinate.

The third acquiring module 30 is configured to acquire a distance between a first coordinate and a coordinate of a center point of the distorted image.

It may be understood that, due to shooting mechanism of the camera module, the closer to the edge of the image, the higher the distortion degree, the closer to the central region, the smaller the distortion degree. Therefore, the third acquiring module 30 may calculate a distance between a distorted coordinate and a coordinate of a center point of the distorted image, and calculate a smoothing processing coefficient based on the preset smoothing processing function and the distance, in which the smoothing processing coefficient is configured to correct a distorted image.

It should be noted that, the smoothing processing function is configured to indicate a proportional relationship between the distance and the smoothing processing coefficient. That is, the closer to the edge region of the image, the larger the distance, the larger the smoothing processing coefficient, the stronger the correction processing; the further to the edge region of the image, the smaller the distance, the smaller the smoothing processing coefficient, the weaker the correction processing. Therefore, it is obvious that, the smoothing processing function may enable the correction degree of the distorted image from the center to the edge to be gradually enhanced, which accordingly ensures smoothing transition, enhances the authenticity of the processed image, and achieves smoothing correction on the distorted image based on the smoothing processing function.

The determining module 40 is configured to determine a smoothing processing coefficient corresponding to the distance based on a preset smoothing processing function, in which the smoothing processing function is configured to indicate a proportional relationship between the distance and the smoothing processing coefficient.

The correction module 50 is configured to acquire a distortion correction image by performing smoothing correction on the first coordinate based on the smoothing processing coefficient and the second coordinate.

Specifically, smoothing correction is performed on the first coordinate in combination with the smoothing processing coefficient and the second coordinate. At this time, since an undistorted coordinate is combined when the distortion is corrected, the definition of the image may be greatly improved. Furthermore, the smoothing processing coefficient is related to the distance and is basically a positive correlation function of the distance. In the image of the wide-angle camera, the distortion amplitude of the central region is relatively small and that of the edge region is relatively large, the sensitivity of the human eye on the definition of the image central region is higher than on the definition of the edge region. Therefore, the correction module 50 achieves reducing the correction degree of central distortion and may achieve that the distortion correction degree from the image center point to the image edge is sequentially smoothly enhanced by the smoothing processing coefficient. In this way, the definition of the image center may be ensured, and the distortion correction degree of the image edge may be also ensured.

In an embodiment of the disclosure, as illustrated in FIG. 8, on the basis of FIG. 6, the correction module 50 includes a second determining unit 51, a first calculating unit 52 and a second acquiring unit 53.

The second determining unit 51 is configured to determine a floating point coordinate corresponding to each first coordinate by calculating the smoothing processing coefficient, the second coordinate and the first coordinate based on a preset algorithm.

The first calculating unit 52 is configured to acquire an integer coordinate and a pixel value of each pixel by performing interpolation calculation on the floating point coordinate.

The second acquiring unit 53 is configured to acquire the distortion correction image based on the integer coordinate point and pixel value.

As illustrated in FIG. 9, on the basis of FIG. 6, the correction module 50 includes a third determining unit 54, a second calculating unit 55 and a correction unit 56.

The third determining unit 54 is configured to determine a first weight of the second coordinate and a second weight of the first coordinate based on the smoothing processing coefficient, in which the first weight is proportional to the smoothing processing coefficient and the second weight is inversely proportional to the smoothing processing coefficient.

The second calculating unit 55 is configured to calculate a first product of the first weight and the second coordinate, and a second product of the second weight and the first coordinate.

The correction unit 56 is configured to acquire the distortion correction image by performing smoothing correction on the first coordinate based on a sum of the first product and the second product.

It should be noted that, the explanation of the embodiments of the method for correcting a distorted image is applied to an apparatus for correcting a distorted image, which will not be repeated here.

In summary, the apparatus for correcting a distorted image in the embodiment of the disclosure performs improvements based on a conventional wide-angle distortion correction algorithm, and performs distortion correction processing by additionally using a weighted smoothing function and still using a bilinear interpolation algorithm. Compared with a conventional distortion correction algorithm, a distribution of distortion in the whole image is considered, and it is achieved that the distortion for different regions of the image is distinguished for correction, on the basis of ensuring high timeliness of the algorithm, not only a loss degree of definition of the distortion correction image is weakened, but also the distortion of the image region with a large distortion is completely eliminated, which achieves an optimal photographing experience.

In order to achieve the above embodiments, the disclosure further provides an electronic device. The electronic device includes a memory, a processor and computer programs stored on the memory and executable by the processor. When the computer programs are executed by the processor, the method for correcting a distorted image as described in the above embodiments is implemented.

In order to achieve the above embodiments, the disclosure further provides a non-transitory computer readable storage medium stored with computer programs thereon, and when the computer programs are executed by a processor, the method for correcting a distorted image as described in the above method embodiments is implemented.

In the specification of the disclosure, descriptions with reference to terms "an embodiment", "some embodiments", "example", "specific example" or "some examples" mean specific features, structures, materials or characteristics described in combination with the embodiment or example are included in at least one embodiment or example of the disclosure. In the specification, the schematic representations of the above terms do not have to be the same embodiment or example. Moreover, specific features, structures, materials or characteristics described may be combined in one or more embodiments or examples in a suitable manner. Furthermore, those skilled in the art may combine and integrate the different embodiments or examples described in the specification, as well as features of the different embodiments or examples without conflicting with each other.

In addition, the terms "first" and "second" are only for describing purposes and are not to be construed as indicating or implying relative importance, or implicitly indicating the number of technical features indicated. Thus, the features defined with the terms "first" and "second" may explicitly or implicitly include at least one of features. In the description of the disclosure, "a plurality of" means at least two, for example, two, three, unless otherwise expressly and specifically stated.

Any process or method described in the flowchart or otherwise described herein may be understood as representing one or more modules, segments, or portions of codes of executable instructions for implementing the steps of a customized logical function or process, and the scope of the preferred embodiments of the present disclosure includes additional implementations, in which the functions may be executed not in the sequence shown or discussed, the scope also including the functions are executed in a substantially simultaneous manner or in a reverse sequence, which will be appreciated by those skilled in the art who the embodiments of the disclosure belong to.

The logics and/or steps represented in the flowchart or described in other ways herein, for example, may be considered as an ordered list of executable instructions configured to implement logic functions, which may be specifically implemented in any computer readable medium, for use of a system, an apparatus or a device for executing instructions (such as a computer-based system, a system including a processor, or other systems that may obtain and execute the instructions from the system, the apparatus or the device for executing instructions) or in combination with the system, the apparatus or the device for executing instructions. A "computer readable medium" in the disclosure may be an apparatus that may contain, store, communicate, propagate or transmit a program for use of a system, an apparatus or a device for executing instructions or in combination with the system, the apparatus or the device for executing instructions. A more specific example (a non-exhaustive list) of a computer readable medium includes the followings: an electronic connector (an electronic apparatus) with one or more cables, a portable computer disk box (a magnetic device), a random access memory (RAM), a read-only memory (ROM), an electrically programmable read-only memory (an EPROM or a flash memory), an optical fiber apparatus, and a portable optical disk read-only memory (CDROM). In addition, a computer readable medium even may be paper or other suitable medium on which programs may be printed, since paper or other medium may be optically scanned, and then edited, interpreted or processed in other suitable ways if necessary to obtain electronically programs and store the programs in a computer memory.

It should be understood that all parts of the present disclosure may be implemented with a hardware, a software, a firmware and their combination. In the above embodiments, a plurality of steps or methods may be stored in a memory and implemented by a software or a firmware executed by a suitable system for executing instructions. For example, if they are implemented with a hardware as in the another implementation, it may be implemented by any of the following technologies or their combinations known in the art: a discrete logic circuit with logic gate circuits configured to achieve logic functions on data signals, a special integrated circuit with appropriate combined logic gate circuits, a programmable gate array (PGA), a field programmable gate array (FPGA), etc.

Those skilled in the art may understand that all or part of steps in the above method embodiments may be implemented by instructing relevant hardwares with computer programs. The programs may be stored in a computer readable storage medium, and when the programs are executed, one of the steps in the method embodiments or their combination is implemented.

In addition, various functional units in the embodiments of the disclosure may be integrated in one processing module, or each of the units may be physically existed alone, or two or more units may be integrated in one module. The integrated module may be achieved by a form of a hardware, and also may be achieved by a form of a software functional module. The integrated module may be stored in a computer readable storage medium when it is implemented in a form of a software functional module and sold or used as an independent product.

The above-mentioned storage medium may be a read-only memory, a magnetic disk or an optical disk. Even though embodiments of the disclosure have been illustrated and described above, it may be understood that, the above embodiments are exemplary and cannot be constructed as a limitation to the disclosure, and various changes, modifications, substitutions and alterations may be made by those skilled in the art for the embodiments within the scope of the disclosure.

What is claimed is:

1. A method for correcting a distorted image, comprising:
acquiring, by a wide-angle camera in an electronic device, a distorted image in raw format to be corrected;
processing, by an image signal processor (ISP) in the electronic device, the distorted image in raw format into a distorted image in yuv format;
acquiring, by a central processing unit (CPU) in the electronic device, a first coordinate of each pixel in the distorted image in yuv format;
determining, by the CPU, internal parameters for shooting the distorted image;
acquiring, by the CPU, a second coordinate corresponding to the first coordinate based on a corresponding relationship between the internal parameters and image distortion degrees, wherein, the second coordinate is an undistorted coordinate corresponding to the first coordinate;
acquiring, by the CPU, a distance between the first coordinate and a coordinate of a center point of the distorted image in yuv format, and determining a smoothing processing coefficient corresponding to the distance based on a smoothing processing function, wherein the smoothing processing function is configured to indicate a proportional relationship between the distance and the smoothing processing coefficient;
acquiring a distortion correction image in yuv format by performing smoothing correction on each first coordinate based on the smoothing processing coefficient and the second coordinate;
displaying, by a display in the electronic device, the distortion correction image in yuv format; and
performing, by an encoder in the electronic device, a Jpeg format coding on the distortion correction image in yuv format, and storing in a memory in the electronic device.

2. The method of claim 1, wherein, acquiring the second coordinate corresponding to the first coordinate comprises:
acquiring the second coordinate by calculating the internal parameters and the first coordinate based on a preset algorithm or
acquiring the second coordinate by inputting the first coordinate into a depth model trained with a large number of sample images.

3. The method of claim 2, wherein the internal parameters are calculated based on pre-stored image coordinates and world coordinates of reference points in a reference object.

4. The method of claim 1, wherein, the smoothing processing function is:

$$S(x) = \frac{1}{1 + e^{-20(x-0.5)}}$$

where x is a normalized Euclidean distance corresponding to the distance, and S(x) is the smoothing processing coefficient.

5. The method of claim 1, wherein, acquiring the distortion correction image comprises:
determining a floating point coordinate corresponding to the first coordinate with a preset equation based on the smoothing processing coefficient, the second coordinate and the first coordinate;
determining an integer coordinate and a pixel value of each pixel by performing interpolation calculation on the floating point coordinate; and
determining the distortion correction image based on the integer coordinate and the pixel value of each pixel.

6. The method of claim 5, wherein the preset equation is expressed by (u1, v1)=(ud, vd)·s+(u0, v0)·(1−s),
where (u1, v1) is the floating point coordinate, s is the smoothing processing coefficient, (ud, vd) is the first coordinate, and (u0, v0) the second coordinate.

7. The method of claim 1, wherein, acquiring the distortion correction image comprises:
determining a first weight of the second coordinate and a second weight of the first coordinate based on the smoothing processing coefficient, wherein, the first weight is proportional to the smoothing processing coefficient and the second weight is inversely proportional to the smoothing processing coefficient;
calculating a first product of the first weight and the second coordinate, and a second product of the second weight and the first coordinate; and
acquiring the distortion correction image by performing smoothing correction on the first coordinate based on a sum of the first product and the second product.

8. An apparatus for correcting a distorted image comprised in an electronic device, comprising:
a processor; and
a memory configured to store with computer programs executable by the processor;
wherein the processor is configured to:
acquire a first coordinate of each pixel in a distorted image in yuv format to be corrected, wherein a distorted image in raw format is acquired by a wide-angle camera in the electronic device and is processed by an image signal processor (ISP) in the electronic device into the distorted image in yuv format;
determine internal parameters for shooting the distorted image;
acquire a second coordinate corresponding to the first coordinate based on a corresponding relationship between the internal parameters and image distortion degrees, wherein, the second coordinate is an undistorted coordinate corresponding to the first coordinate;
acquire a distance between the first coordinate and a coordinate of a center point of the distorted image in yuv format, and determine a smoothing processing coefficient corresponding to the distance based on a smoothing processing function, wherein the smoothing processing function is configured to indicate a proportional relationship between the distance and the smoothing processing coefficient; and
acquire a distortion correction image in yuv format by performing smoothing correction on each first coordinate based on the smoothing processing coefficient and the second coordinate,
wherein the distortion correction image in yuv format is displayed on a display in the electronic device, and wherein a Jpeg format coding on the distortion correction image in yuv format is performed by an encoder in the electronic device and is stored in a memory in the electronic device.

9. The apparatus of claim 8, wherein the processor is further configured to:

acquire the second coordinate by calculating the internal parameters and the first coordinate based on a preset algorithm; or acquire the second coordinate by inputting the first coordinate into a depth model trained with a large number of sample images.

10. The apparatus of claim 9, wherein the internal parameters are calculated based on pre-stored image coordinates and world coordinates of reference points in a reference object.

11. The apparatus of claim 8, wherein, the smoothing processing function is:

$$S(x) = \frac{1}{1 + e^{-20(x-0.5)}}$$

where, x is a normalized Euclidean distance corresponding to the distance, and S(x) is the smoothing processing coefficient.

12. The apparatus of claim 8, wherein the processor is further configured to:

determine a floating point coordinate corresponding to the first coordinate with a preset equation based on the smoothing processing coefficient, the second coordinate and the first coordinate based on a preset algorithm;

determine an integer coordinate and a pixel value of each pixel by performing interpolation calculation on the floating point coordinate; and determine the distortion correction image based on the integer coordinate and pixel value of each pixel.

13. The apparatus of claim 12, wherein the preset equation is expressed by (u1, v1)=(ud, vd)·s+(u0, v0)·(1−s), where (u1, v1) is the floating point coordinate, s is the smoothing processing coefficient, (ud, vd) is the first coordinate, and (u0, v0) the second coordinate.

14. The apparatus of claim 8, wherein the processor is further configured to:

determine a first weight of the second coordinate and a second weight of the first coordinate based on the smoothing processing coefficient, wherein, the first weight is proportional to the smoothing processing coefficient and the second weight is inversely proportional to the smoothing processing coefficient;

calculate a first product of the first weight and the second coordinate, and a second product of the second weight and the first coordinate; and acquire the distortion correction image by performing smoothing correction on the first coordinate based on a sum of the first product and the second product.

15. An electronic device, comprising:

a wide-angle camera, configured to acquire a distorted image in raw format to be corrected;

an image signal processor (ISP), configured to process the distorted image in raw format into a distorted image in yuv format;

a central processing unit (CPU), configured to:
  acquire a first coordinate of each pixel in the distorted image in yuv format,
  determine internal parameters for shooting the distorted image,
  acquire a second coordinate corresponding to the first coordinate based on a corresponding relationship between the internal parameters and image distortion degrees, wherein the second coordinate is an undistorted coordinate corresponding to the first coordinate,
  acquire a distance between the first coordinate and a coordinate of a center point of the distorted image in yuv format, and determine a smoothing processing coefficient corresponding to the distance based on a smoothing processing function, wherein the smoothing processing function is configured to indicate a proportional relationship between the distance and the smoothing processing coefficient, and
  acquiring a distortion correction image in yuv format by performing smoothing correction on each first coordinate based on the smoothing processing coefficient and the second coordinate;

a display, configured to display the distortion correction image in yuv format; and an encoder, configured to perform a Jpeg format coding on the distortion correction image in yuv format and store in a memory of the electronic device.

16. The electronic device of claim 15, wherein the CPU is further configured to:

acquire the second coordinate by calculating the internal parameters and the first coordinate based on a preset algorithm; or acquire the second coordinate by inputting the first coordinate into a depth model trained with a large number of sample images.

17. The electronic device of claim 16, wherein the internal parameters are calculated based on pre-stored image coordinates and world coordinates of reference points in a reference object.

18. The electronic device of claim 15, wherein, the smoothing processing function is:

$$S(x) = \frac{1}{1 + e^{-20(x-0.5)}}$$

where, x is a normalized Euclidean distance corresponding to the distance, and S(x) is the smoothing processing coefficient.

19. The electronic device of claim 15, wherein the CPU is further configured to:

determine a floating point coordinate corresponding to the first coordinate with a preset equation based on the smoothing processing coefficient, the second coordinate and the first coordinate;

determine an integer coordinate and a pixel value of each pixel by performing interpolation calculation on the floating point coordinate; and determine the distortion correction image based on the integer coordinate and pixel value of each pixel.

20. The electronic device of claim 15, wherein the CPU is further configured to:

determine a first weight of the second coordinate and a second weight of the first coordinate based on the smoothing processing coefficient, wherein, the first weight is proportional to the smoothing processing coefficient and the second weight is inversely proportional to the smoothing processing coefficient;

calculate a first product of the first weight and the second coordinate, and a second product of the second weight and the first coordinate; and acquire the distortion correction image by performing smoothing correction on the first coordinate based on a sum of the first product and the second product.

\* \* \* \* \*